United States Patent Office.

WILLIAM BAUSTIAN, OF DAVENPORT, IOWA.

Letters Patent No. 62,922, dated March 19, 1867; antedated March 11, 1867.

IMPROVEMENT IN THE MANUFACTURE OF FRICTION MATCHES.

The Schedule referred to in these Letters Patent and making part of the same.

TO ALL WHOM IT MAY CONCERN:

Be it known that I, WILLIAM BAUSTIAN, of Davenport, Scott county, Iowa, have invented a new and improved Mode of Manufacturing Friction Matches; and I do hereby declare that the following is a full and exact description.

The nature of my invention is to dip matches by the bundle, and I proceed in the following manner: I take a bundle of sticks, of the usual size, containing five hundred or one thousand, tie them together with a string near the tail ends, then put the head end of the bundle upon a table or board, or upon the palm of my left hand, and press the palm of my right hand upon the tail end of said bundle; then I turn the palm of my right hand a little around, whereby the heads of the sticks are turned so far apart or separated that they can be properly dipped; then, after the bundle has been heated upon a stove, I dip it in liquid sulphur. This sulphur dries forthwith on the sticks, and then I rub the bundle, in order to remove the clodded sulphur between the matches, and put them back to their original position in the bundle. Then I turn the matches again by the palms of the hands, or otherwise, as above described, so that the heads be set apart, and dip them in a fluid composed as follows: three and a half pounds of glue is mixed with one and a half quart of boiling water, and boiled so long till the glue is totally dissolved and the water evaporated; then two to two and a half quarts of boiling water are added; and, after the glue has been totally dissolved, two and a half pounds of phosphorus are added, which having been stirred until totally mixed with the glue, there are added two and a half pounds dry white zinc, two and a half pounds Paris white, and two and a half ounces of lamp-blacking; and these being stirred until totally mixed, there is added three-fourths of a pound of rosin dissolved in one quart alcohol; and, this having been mixed again, there is added one-half pound of sublimed sulphur. Instead of cutting the sticks at the usual length, cut them at double length, and proceed as hereinbefore described, after which cut the dipped sticks in the middle. If the dipping fluid is to be used and heated a second time, add some phosphorus to take the place of the evaporated parts of the fluid. By applying this process all machinery now in use for dipping matches is dispensed with.

What I claim as my invention, and desire to secure by Letters Patent, is—

The composition wherein the matches are dipped, as hereinbefore described.

W. BAUSTIAN.

Witnesses:
  FR. WM. KARNEL,
  BL. PETERS.